US000001155H

United States Statutory Invention Registration [19]

[11] Reg. Number: H1155

Fratello et al.

[43] Published: Mar. 2, 1993

[54] OPTICAL ISOLATOR WITH IMPROVED STABIITY

[75] Inventors: Vincent J. Fratello, New Providence, N.J.; Ralph S. Jameson, Allentown, Pa.; Steven J. Licht, Bridgewater, N.J.

[73] Assignee: American Telephone and Telegraph Company, New York, N.Y.

[21] Appl. No.: 895,211

[22] Filed: Jun. 8, 1992

Related U.S. Application Data

[63] Continuation of Ser. No. 698,436, May 10, 1991, abandoned.

[51] Int. Cl.[5] ..... G02F 1/09

[52] U.S. Cl. ..... 359/484; 359/281

[58] Field of Search ..... 350/376, 377, 378, 387; 359/281, 282, 283, 484

[56] References Cited

U.S. PATENT DOCUMENTS

| | | | |
|---|---|---|---|
| 4,178,073 | 12/1979 | Uchida et al. . | |
| 4,548,478 | 10/1985 | Shirasaki | 350/377 |
| 4,712,880 | 12/1987 | Shirasaki | 350/377 |
| 4,755,026 | 7/1988 | Honda et al. | 350/376 |
| 4,756,607 | 7/1988 | Wantanabe et al. | 350/375 |
| 4,804,256 | 2/1989 | Wilson | 350/376 |
| 4,893,890 | 1/1990 | Lutes | 350/378 |
| 4,981,341 | 1/1991 | Brandle, Jr. et al. | 350/377 |
| 4,988,170 | 1/1991 | Buhrer | 350/377 |
| 5,029,953 | 7/1991 | Dexter et al. | 350/378 |
| 5,033,830 | 7/1991 | Jameson | 359/484 |
| 5,052,786 | 10/1991 | Schulz | 359/484 |

FOREIGN PATENT DOCUMENTS

| | | | |
|---|---|---|---|
| 63-77015 | 4/1988 | Japan | 350/378 |

OTHER PUBLICATIONS

"Temperature-stable Faraday rotator . . . ", S. Matsumoto et al. *Applied Optics*, vol. 25, No. 12, Jun. 1986 pp. 1940–1945.

"Temperature-compensated Faraday rotator . . . ", K. Machida et al., *Optoelectronics*, vol. 3, No. 1, Jun. 1988 pp. 99–105.

"Wavelength independent Faraday isolator", P. A. Schulz, *Applied Optics*, vol. 28, No. 20, Oct. 1989, pp. 4458–4464.

"Wideband temperature-compensated optical . . . ", C. F. Buhrer, *Optics Letters*, vol. 14, No. 21, Nov. 1989 pp. 1180–1182.

*Primary Examiner*—Bernarr E. Gregory
*Attorney, Agent, or Firm*—Wendy W. Koba

[57] ABSTRACT

An optical isolator is disclosed which comprises a Faraday rotator disposed between a pair of polarization selective elements (e.g., linear polarizers, birefringent wedges, birefringent plates, etc.). Improvement in isolation stability as a function of variations in temperature and/or signal wavelength are achieved in accordance with the teachings of the present invention by utilizing a Faraday device with a rotation $\theta$ less than the conventional 45°. A linear reduction in $\theta$, while resulting in a some signal loss, provides a linear increase in both temperature and wavelength stability.

21 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$I_T$
$I_T'$
OA
$I_R$
20
16
$\alpha$
$\alpha'$
12
$\Theta$
$(\Theta < 45°)$
t
14
$0°$
18
10

OPTICAL ISOLATOR WITH IMPROVED STABIITY

This application is a continuation of application Ser. No. 07/698,436, filed on May 10, 1991, now abandoned.

BACKGROUND OF THE INVENTION

1. Technical Field

The present invention relates to an optical isolator with improved stability and, more particularly, to the utilization of a Faraday rotator configured to provide improved stability of the optical isolation with respect to variations in parameters such as temperature or wavelength.

2. Description of the Prior Art

Reflections in optical systems often generate noise and optical feedback which may degrade the performance of various components, particularly semiconductor lasers. Therefore, the ability to optically isolate lasers and other sensitive components from these reflections is critical to the performance of the system. The Faraday effect in magneto-optic material provides a unique non-reciprocal device capable of performing the isolation function. In general, a conventional optical isolator comprises a 45° Faraday rotator encased in a bias magnet and disposed between a pair of polarization selective means (e.g., linear polarizers, birefringent plates, or birefringent wedges) oriented at an angle of 45° to each other. Signals passing through the isolator in the transmitting, forward direction will be essentially unaffected by the polarization selective means and rotator. However, return reflections will be rotated such that the signal will be essentially blocked from the propagating back into the signal source (e.g., laser).

The ability of an isolator to block reflected signals is frequently expressed in terms of the "extinction ratio" (ER), where ER (in dB) is defined as $-101$ og ($I_R/I_0$, $I_0$ being defined as the incoming reflected intensity parallel to the output polarizer and $I_R$ as the outgoing reflected intensity from the input polarizer towards the source (e.g., laser). Assuming ideal polarization selective elements (at a 45° angle in relative orientation), the extinction ratio ER can be expressed as $-101$ og ($\sin^2\Theta_T$), where $\Theta_T$ is defined as the departure from 45° in Faraday rotation. For example, a conventional magneto-optic material such as yttrium iron garnet (YIG) exhibits a temperature variation in Faraday rotation of approximately 0.04°/°C. at a wavelength of 1300 nm (for a conventional 45° Faraday rotator). A material such as a commercially available bismuth-substituted rare earth iron garnet is known to exhibit an even higher temperature-dependent change in Faraday rotation of approximately 0.06°–0.07°/°C. These changes in rotation as a function of temperature thus change the rotation imparted on a signal passing therethrough and, hence, the degree of isolation provided by the Faraday rotator.

U.S. Pat. No. 4,756,687 issued to N. Watanabe et al. on Jul. 12, 1988 discloses an exemplary arrangement addressing the temperature stability problem. In particular, Watanabe et al. dislose a cascaded isolator arrangement comprising a pair of isolators, the first including a 45° Faraday rotator tuned to a wavelength $\lambda_1$ slightly less than the system wavelength $\lambda_0$, and the second including a 45° Faraday rotator tuned to a wavelength $\lambda_2$ slightly greater that $\lambda_0$. The temperature-induced variation in rotation of the first Faraday rotator is thus substantially cancelled by the rotation deviation of the second isolator stage. Although the Watanabe et al. arrangement does provide improvement in terms of temperature stability, the resulting structure is at least twice the size of a conventional isolator and exhibits increased signal loss (as a result of additional components and tuning of the rotators away from the nominal system wavelength).

Another problem with conventional optical isolators is their stability as a function of transmitted signal wavelength. In particular, garnet will exhibit a change in rotation as a function of wavelength. U.S. Pat. No. 4,712,880 issued to M. Shirasaki on Dec. 15, 1987 discloses an isolator arrangement including polarization compensation means for providing an isolator design which is less sensitive to drift in the system wavelength. The Shirasaki arrangement comprises a first birefringent wedge plate; a polarization rotation compensator composed of a combination of a half-wave plate and a quarter-wave plate; a 45° Faraday rotator; and a second birefringent wedge. The polarization rotation compensator may be designed to provide nearly linear isolation over a wavelength range of, for example, 1.3 μm to 1.5 μm. As with the above Watanabe et al. arrangement, however, the Shirasaki isolator requires a number of additional components which adds to the overall coast and complexity of the resulting design.

Therefore, a need remains in the prior art for an optical isolator capable of providing temperature and wavelength stability without unduly increasing the cost, size or complexity of the resulting arrangement.

SUMMARY OF THE INVENTION

The need remaining in the prior art is addressed by the present invention which relates to an optical isolator and, more particularly, to an optical isolator utilizing a Faraday rotator configured to provide improved stability in parameters such as temperature and wavelength.

In accordance with an exemplary embodiment of the present invention, an optical isolator is formed which imparts a rotation $\theta$ of less then 45° to the polarization state of an optical signal passing therethrough. In particular, an inventive optical isolator may include a magneto-optic element (hereinafter referred to as a Faraday rotator) disposed between a pair of polarization selective elements. The reduction in rotation ($\Delta\theta$) from 45°, while slightly reducing the optical power of the output signal, has been found to increase both the temperature and wavelength stability of the isolator. In particular, there exists a linear relationship between the reduction of the rotation (i.e., $\Delta\theta$) and the reduction in the variation of the Faraday rotation with changes in wavelength ($\Delta\lambda$) and temperature ($\Delta T$).

In a preferred embodiment of the present invention, the reduction in rotation is accomplished by providing a Faraday rotator with a reduced thickness t as compared to a conventional 45° rotator, since rotation is directly proportional to material thickness for a given composition. For an exemplary arrangement of the present invention, a Faraday rotator may be configured to provide a rotation of approximately 10% less than the nominal 45°, (in the range of, for example, $\theta=40°–42°$), thus resulting in an increase in temperature and wavelength stability in the reverse (isolation) direction of approximately 10%. With the pair of polarization selective elements disposed to one another at an angle $\alpha$ such that $\theta+\alpha\approx 90°$, the isolator of the present invention will be capable of essentially blocking any reflected signals incident thereon. The cost of increasing the temperature and wavelength stability is a slight reduction in the transmission of the isolator in the forward (transmitting) direction.

Alternatively, reduction in rotation may be accomplished by reducing the intensity of the magnetic field, B, utilized to induce the Faraday effect in the magneto-optical material. As with the physical material reduction described above, a linear reduction in the strength of the applied field will yield a similar improvement in both temperature and wavelength stability.

In one embodiment of the present invention, the requirements of output power and isolation may be altered such that the isolator experiences improved output power, at the cost of a slight reduction in isolation performance. For this embodiment, the pair of polarization selective elements may be disposed at an angle of $\alpha$ to one another such that $\alpha \cong \theta$, where the close $\alpha$ is to $\theta$, the more the output power level will approach 100% (at the cost of decreased isolation). Accordingly, there exists a trade-off between the requirements of optical power and isolation which may be considered on a case-by-case basis while utilizing the isolator configuration of the present invention and enjoying the increased temperature and wavelength stability.

An advantage of the present invention is that the improvement in temperature and wavelength stability may be provided by generating a reduced Faraday rotation without modifying any of the components within the isolator arrangement. Accordingly, the isolator design of the present invention may be utilized with a variety of different polarization selective means including, but not limited to, linear polarizers, birefringent wedges, birefringent plates, half-wave plates, quarter-wave plates, or any combination of the above. Further, the ability to form a rotation less than 45° is not dependent upon the type of magneto-optic material utilized, since the rotation, as discussed below, may be controlled by changing the thickness of the magneto-optical material, applied magnetic field, or both.

Other and further advantages of the present invention will become apparent during the course of the following discussion and by reference to the accompanying drawings.

BRIEF DESCRIPTION OF THE DRAWING

Referring now to the drawings.

DETAILED DESCRIPTION

Figure 1:
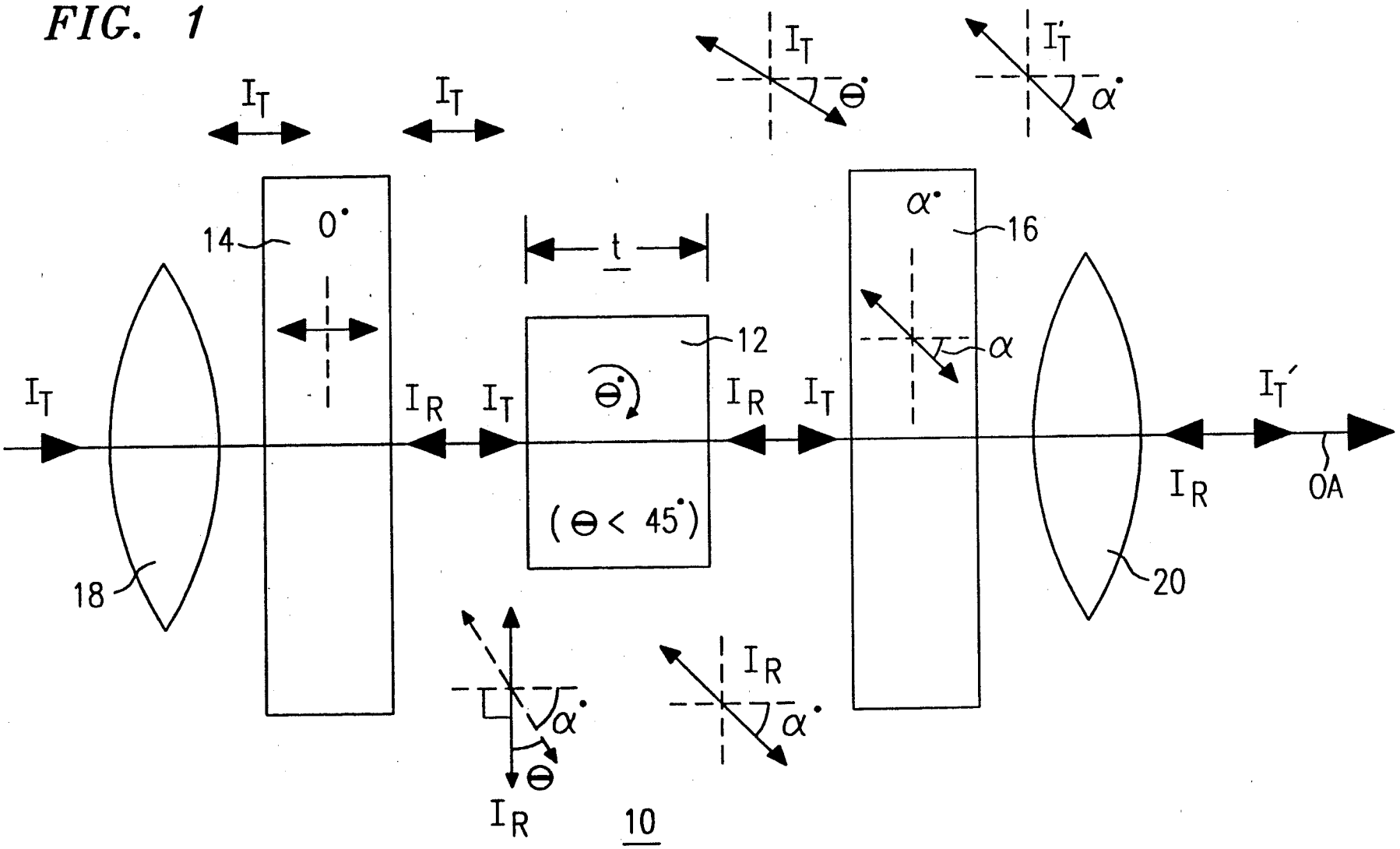
FIG. 1 illustrates an exemplary optical isolator formed in accordance with the present invention, where the configuration of the Faraday rotator (either reduced material thickness, applied magnetic field, or both) is chosen such that a rotation $\theta$ of less than 45° is achieved.

FIG. 1 illustrates, in simplified form, an exemplary optical isolator 10 formed in accordance with the present invention. As shown, isolator 10 comprises a Faraday rotator 12 (for example, a magneto-optic material such as yttrium iron garnet (YIG) or bismuth-substituted rare earth iron garnet) which comprises a predetermined thickness t and/or an applied magnetic field intensity B capable of providing a rotation (e.g., clockwise) through rotator 12 of less than 45°. Faraday rotator 12 is illustrated as disposed between a pair of polarization selective elements, which for this particular embodiment are illustrated as a pair of linear polarizers 14,16. As shown, polarizer 16 is oriented at an angle $\alpha$ with respect to polarizer 14. As mentioned above, the values for $\theta$ and $\alpha$ may be chosen such that $\theta+\alpha \cong 90°$. to provide maximum optical isolation in the reverse direction. Alternatively, choosing $\theta \cong \alpha$ will provide maximum output power. In either case, $\theta$ is defined to be less than 45° in accordance with the teachings of the present invention and $\alpha$ may comprise any suitable value for the operation of the isolator. It is to be understood that the illustration of linear polarizers is exemplary only and various other polarization selective elements including, but not limited to, birefringent wedges, birefringent plates, half-wave plates, quarter-wave plates, or any combination of components capable of providing the desired polarization selective function, may be used in association with the Faraday rotator design of the present invention.

In operation, a transmitted signal $I_T$ is coupled (by a first lens 18, for example) into isolator 10 along optical axis OA. As shown in FIG. 1, isolator 10 is oriented so that first polarizer 14 is aligned with the plane of polarization of signal $I_T$ such that signal $I_T$ passes therethrough essentially unimpeded. Signal $I_T$ next encounters Faraday rotator 12, where the polarization state of signal $I_T$ is rotated (for example, clockwise as shown in FIG. 1) as it propagates through the thickness t of Faraday rotator 12. Upon exiting Faraday rotator 12, the polarization state of signal $I_T$ has rotated $\theta$°, as shown in FIG. 1, where $\theta$ (as controlled by the thickness t and applied magnetic field B) is chosen to be less than 45°. Rotated signal $I_T$ next passes through second polarizer 16 (disposed at an angle $\alpha$ with respect to optical axis OA). The output from second polarizer 16, denoted $I'_T$ is then coupled (by a second lens 20, for example) into the output of isolator 10. Assuming that $\theta+\alpha \cong 90°$, a slight loss of signal will occur at the output of isolator 10, since $\alpha$ is not equal to $\theta$. In particular, the transmitted output power $I'_T$ may be defined by:

$$I'_T = I_0 \kappa \cos^2[\alpha-\theta],$$

wherein $I_0$ is defined as the incident power of signal $I_T$ at the input to first polarizer 14 and $\kappa$ is defined as a loss term due to absorption, scattering and Fresnel losses. Assuming $\theta$ is chosen as 42° and $\theta+\alpha \cong 90°$, then $\alpha$ is approximately 48°. The $\cos^2$ expression in eq.(1) results in a value of approximately 0.9891, representing a loss in output signal power of approximately 2%. Alternatively, assuming that $\theta \cong \alpha$, the same $\cos^2$ term results in a value of 1, representing approximately 100% transmission of the signal through isolator 10. As mentioned above, any suitable value for $\alpha$ may be utilized, the two values of $\alpha$ chosen above understood as being exemplary only.

In accordance with isolation technology, the function of arrangement 10 is to prevent reflected signals from re-entering optically sensitive components located "upstream" of the signal path, such as a transmitting laser (not shown). That is, a reflected signal $I_R$ (which in the worst case would be aligned with the polarization state of second polarizer 16) needs to be blocked from re-entering optically sensitive devices. As shown in FIG. 1, a reflected signal $I_R$ may be coupled by lens 20 into isolator 10 and propagate through second polarizer 16 essentially unimpeded (worst case), assuming alignment of the polarization state of signal $I_R$ with the orientation of second polarizer 16. Reflected signal $I_R$ next propagates through the thickness t of Faraday rotator 12. Since a Faraday rotator (regardless of its thickness) is a non-reciprocal device, the polarization state of signal $I_R$ will experience the same clockwise rotation (of $\theta°$) as transmitted signal $I_T$. Assuming that $\theta+\alpha\cong 90°$, signal $I_R$ will exit Faraday rotator 12 essentially perpendicular to the polarization plane of first polarizer 14, as shown in FIG. 1. Thus, reflected signal $I_R$ will be essentially prevented from passing through first polarizer 14 and entering any downstream component. Alternatively, assuming that $\alpha\cong\theta$, signal $I_R$ will exit rotator 12 at an angle $2\theta$ with respect to the polarization state of first polarizer 14 (where $20<90°$). Therefore, a slight return signal (~2–3%) will be coupled into the signal path, which may be described as a reduction in isolation.

Figure 2:
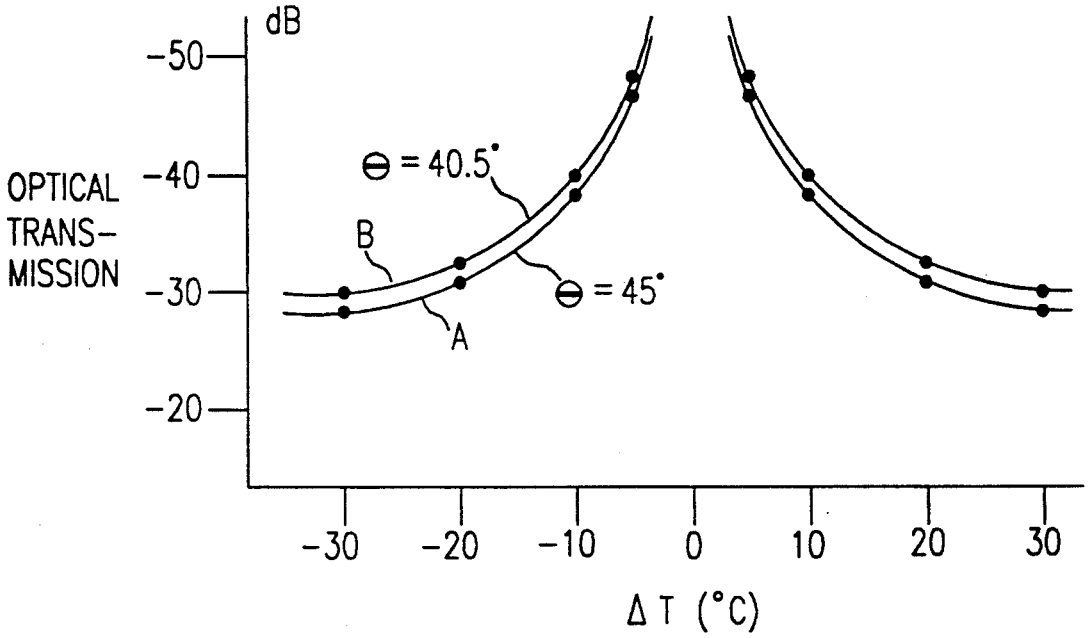
FIG. 2 is a graph illustrating isolation as a function of changes in temperature, for both a conventional 45° Faraday rotator and a 40.5° Faraday rotator formed in accordance with the present invention.
Figure 3:
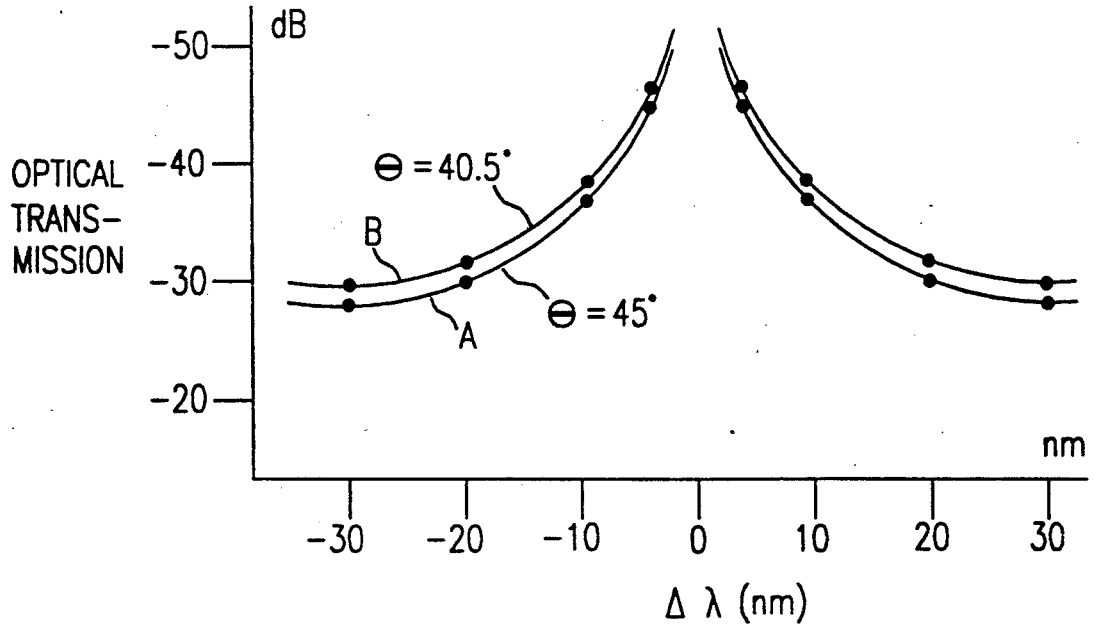
FIG. 3 is a graph illustrating isolation as a function of changes in signal wavelength, for both a conventional 45° Faraday rotator and a 40.5° Faraday rotator formed in accordance with the present invention.

Conventional isolators are known exhibit a degree of dependence on both the ambient temperature (T) and the wavelength (λ) of the signal passing therethrough. For example, the temperature coefficient of a 45° Faraday rotator comprising YIG (intended for operation with an optical signal at a wavelength of approximately 1300 or 1500 nm) is known to be about 0.04°/°C., and those using a bismuth-substituted rare earth iron are in the range of 0.06°–0.07°/°C. In conventional arrangements, a 45° Faraday rotator is designed to exhibit a zero-valued temperature variation at a particular temperature and wavelength (e.g., room temperature and $\lambda_0$ of 1.5 μm). FIG. 2 illustrates, in curve A, the effect of temperature variation on the isolation function of a conventional 45° Faraday rotator. As shown, the Faraday rotator exhibits maximum isolation (>40 dB) at the designed temperature (e.g., room temperature). As the temperature either increases above or decreases below this value, the isolation diminishes in the manner illustrated in curve A of FIG. 2. FIG. 3 illustrates, in curve A, a similar graph for the effect of wavelength variation on isolation. Here, as the system wavelength drifts away from the nominal value (e.g., 1.5 μm), the isolation decreases.

As will be discussed in detail below, an improvement in both temperature and wavelength stability may be achieved in accordance with the teachings of the present invention by reducing the rotation $\theta$ of Faraday rotator 12. In particular, the rotation $\theta$ may be expressed as $$\theta=R(\lambda,T,B)\times t$$

where R is defined as the specific rotation of a particular magneto-optic material (and is dependent upon λ, T and B), and t is the physical thickness of the material. In accordance with the teachings of the present invention, it is desired to minimize the change in reflected signal $I_R$ for variations in either λ or T. In particular, reflected signal $I_R$ can be expressed as:

$$I_R=I_0\kappa[\cos^2(\theta+\alpha)+\beta],$$

where $I_0$ is defined as the incident powder of reflected $I_R$ at the output of isolator 10. The term $\kappa$ is defined as a loss term due to absorption, scattering and Fresnel loss, and $\beta$ is defined as a limiting value on isolation related to the limited extinction ratio of the polarization selective means, scattering and/or birefringence losses. As mentioned above, assuming that the polarization state of $I_0$ is aligned with the orientation of second polarizer 16 provides the worst case analysis. Calculating the derivative of equation (3) with respect to the parameters λ and T thus provides the analysis required to minimize the variations. In particular, the derivative of $I_R$ with respect to λ may be expressed as:

$$\frac{d}{d\lambda}(I_R) = -2I_0\kappa\sin[2(\theta+\alpha)]\left[\frac{\delta\theta}{\delta\lambda}\right]$$

Similarly, the derivative with respect to T can be expressed as:

$$\frac{d}{dT}(I_R) = -2I_0\kappa\sin[2(\theta+\alpha)]\left[\frac{\delta\theta}{\delta T}\right].$$

Substituting from equation (2), the above derivatives can be rewritten as:

$$\frac{d}{d\lambda}(I_R) = -2I_0\kappa\sin[2(\theta+\alpha)]\left[\frac{\delta R(\lambda,T,B)}{\delta\lambda}\ \frac{\theta}{R(\lambda,T,B)}\right], \text{ and}$$

$$\frac{d}{dT}(I_R) = -2I_0\kappa\sin[2(\theta+\alpha)]\left[\frac{\delta R(\lambda,T,B)}{\delta T}\ \frac{\theta}{R(\lambda,T,B)}\right].$$

Since the quantity R(λ,T,B) and its partial derivatives are defined by the material used to form the rotator (and, therefore, cannot be controlled), the only way to minimize the above variations in reflected signal $I_R$ is to reduce $\theta$, the actual rotation of the wave through the Faraday rotator.

In the implementation of the present invention, the reduction in $\theta$ may be achieved by reducing either the thickness t of the rotator material, or the intensity of the applied magnetic field B (where $\theta$=R(λ,T,B)t). For example, a 10% reduction in rotation $\theta$ (i.e., from 45.0° to 40.5°) has been found to yield an approximate 10% increase in both wavelength and temperature stability. FIG. 2 illustrates, in curve B, the improvement in isolation as a function of the increase in temperature stability when utilizing a Faraday rotator of $\theta<45°$ (in particular, for $\theta=40.5°$) in accordance with the teachings of the present invention. Similarly, FIG. 3 illustrates, in curve B, the improvement in isolation as a function of the increase in wavelength stability when utilizing an exemplary Faraday rotator formed in accordance with the teachings of the present invention.

It is to be understood that the above-described embodiments of the present invention are exemplary only and various modifications may be made by those skilled in the art of optical isolation. For example, the Faraday rotator design of the present invention may be utilized in conjunction with virtually any components capable of providing optical isolation, as long as the rotation provided by the Faraday rotator is maintained less than 45°.

We claim:

1. An optical isolator comprising a first polarization selective element;

a second polarization selective element disposed at an angle $\alpha$ with respect to said first polarization selective element;

Faraday rotation means disposed in an optical signal path between said first and second elements characterized in that the Faraday rotation means comprises a magnetic field source for generating a magnetic field B of a predetermined intensity; and magneto-optic means comprising a predetermined thickness t and coupled to the magnetic field source, wherein either one or both of said predetermined field intensity and said thickness t are chosen such that said Faraday rotation means exhibits a predetermined stability of isolation with respect to changes in temperature or wavelength by providing a rotation $\theta$ of less than 45° to an optical signal passing therethrough.

2. An optical isolator as defined in claim 1 wherein the Faraday rotation means comprises magneto-optic means which has a predetermined thickness t capable of providing the desired rotation $\theta$ of less than 45°.

3. An optical isolator as defined in claim 1 wherein the predetermined magnetic field intensity is chosen to generate a rotation of less than 45° within the magneto-optical material.

4. An optical isolator as defined in claim 1 wherein wherein the predetermined thickness t and the magnetic field intensity B are chosen to provide a rotation $\theta$ of less than 45°.

5. An optical isolator as defined in claim 1 wherein the Faraday rotator includes a rare earth iron garnet magneto-optical material.

6. An optical isolator as defined in claim 5 wherein the rare earth iron garnet material comprises yttrium iron garnet.

7. An optical oscillator as defined in claim 5 wherein the rare earth iron garnet material comprises bismuth-substituted rare earth iron garnet.

8. An optical isolator as defined in claim 1 wherein $\alpha$ is chosen such that $\theta+\alpha \leqq 90°$.

9. An optical isolator as defined in claim 8 wherein $\alpha+\theta \approx 90°$.

10. An optical isolator as defined in claim 8 wherein $\alpha \approx \theta$.

11. An optical isolator as defined in claim 1 wherein $\theta$ is within the range of aproximately 40°–43°.

12. An optical isolator as defined in claim 1 wherein the first and second polarization selective elements are chosen from the group consisting of linear polarizers, birefringent wedges, birefringent plates, half-wave plates, quarter-wave plates.

13. An optical isolator as defined in claim 12 wherein the first and second polarization selective elements comprise first and second linear polarizers.

14. An optical isolator as defined in claim 12 wherein the first and second polarization selective elements comprise first and second birefringent wedges.

15. An optical isolator including a Faraday rotator characterized in that the Faraday rotator comprises a magnetic field source for generating a magnetic field B of a predetermined intensity; and magneto-optic means, comprising a predetermined thickness t, coupled to the magnetic field source wherein either one or both of the predetermined field intensity B and predetermined thickness t are chosen such that said Faraday rotator exhibits a predetermined stability of isolation with respect to changes in temperature or wavelength by providing a rotation $\theta$ of less than 45° to an optical signal passing therethrough.

16. An optical isolator as defined in claim 15 wherein the Faraday rotator comprises a magneto-optic material having a predetermined thickness t determined to provide a rotation $\theta$ less than 45°.

17. An optical isolator as defined in claim 15 wherein the predetermined magnetic field intensity is chosen to provide the desired rotation of less than 45° within the magneto-optic means.

18. An optical isolator as defined in claim 15 wherein the predetermined thickness and and magnetic field intensity are chosen to provide a rotation $\theta$ of less than 45°.

19. An optical isolator as defined in claim 15 wherein the Faraday rotator comprises a rare earth iron garnet magneto-optic material.

20. An optical isolator as defined in claim 19 wherein the rare earth iron garnet comprises yttrium iron garnet (YIG).

21. An optical isolator as defined in claim 20 wherein the rare earth iron garnet comprises bismuth-substituted rare earth iron garnet.

* * * * *